A. B. LANDIS.
GRINDING MACHINE.
APPLICATION FILED NOV. 20, 1909.
1,015,567.
Patented Jan. 23, 1912.
11 SHEETS—SHEET 10.
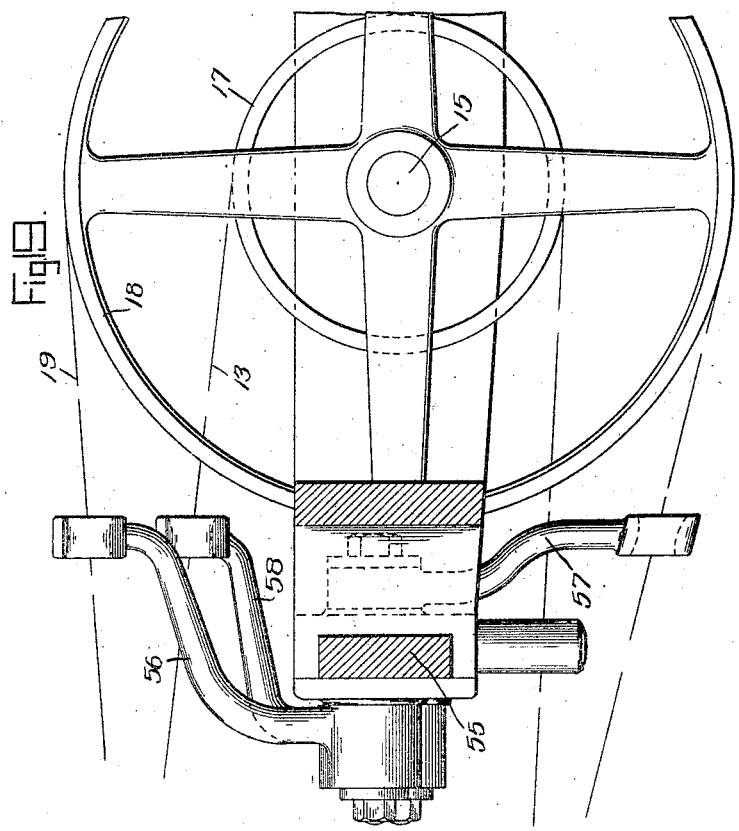
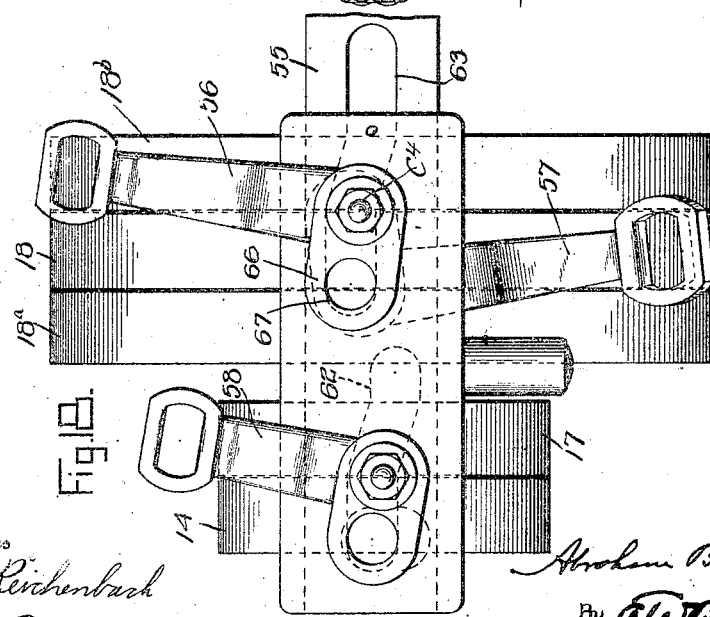
Witnesses
C. K. Reichenbach
H. D. Brown
Inventor
Abraham B. Landis,
By E. W. Bradford
Attorney

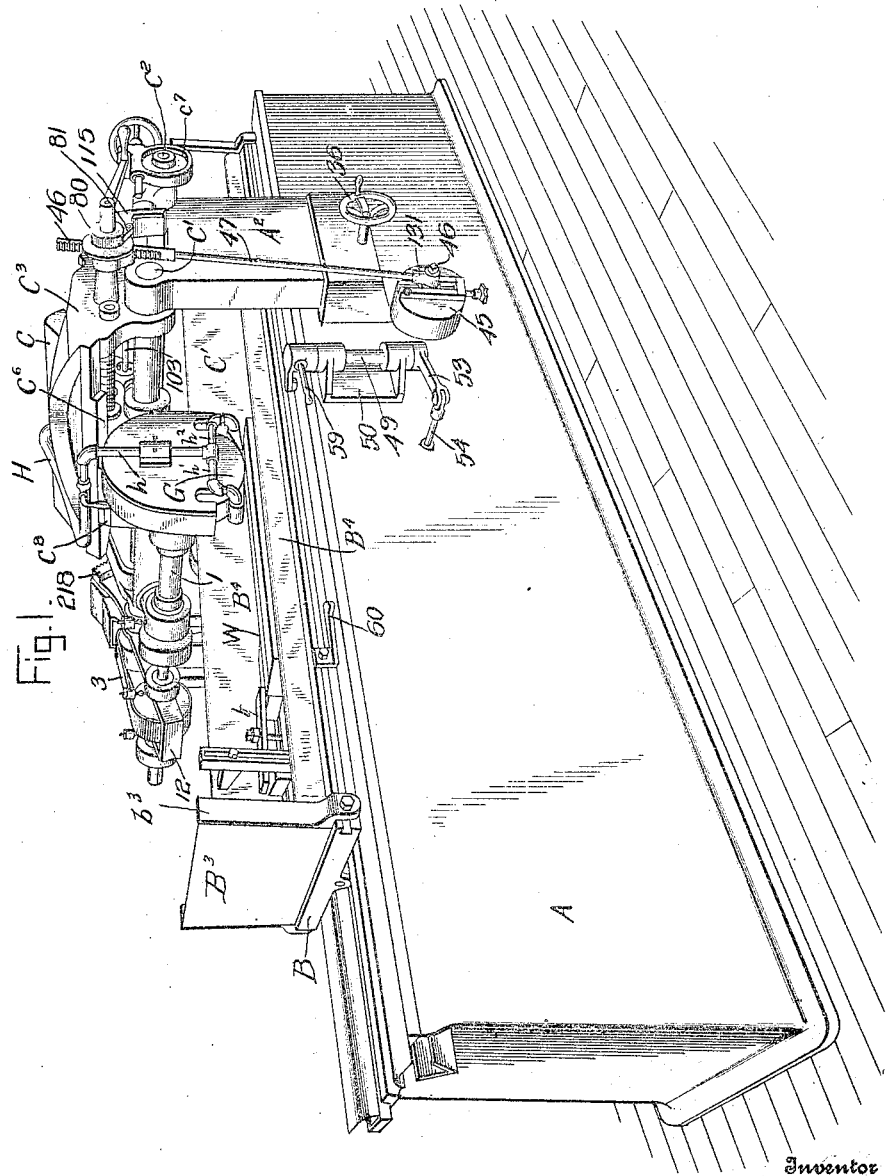

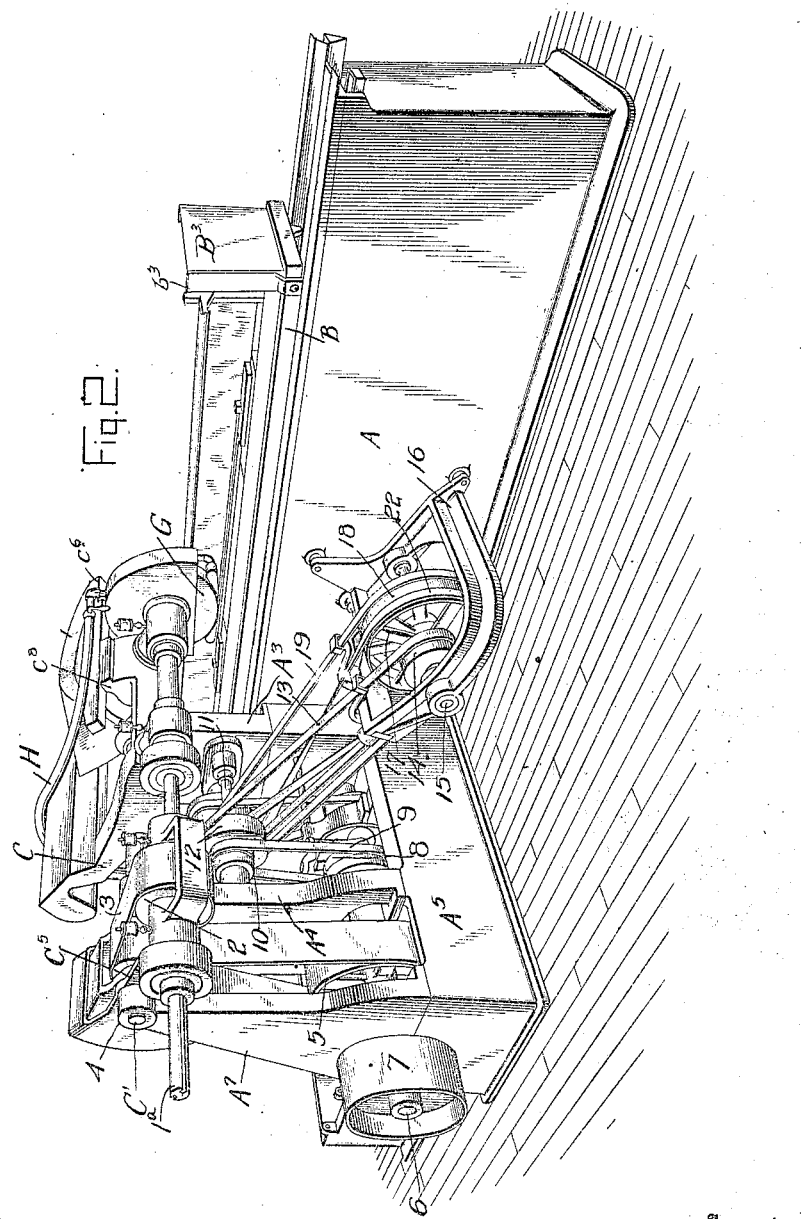

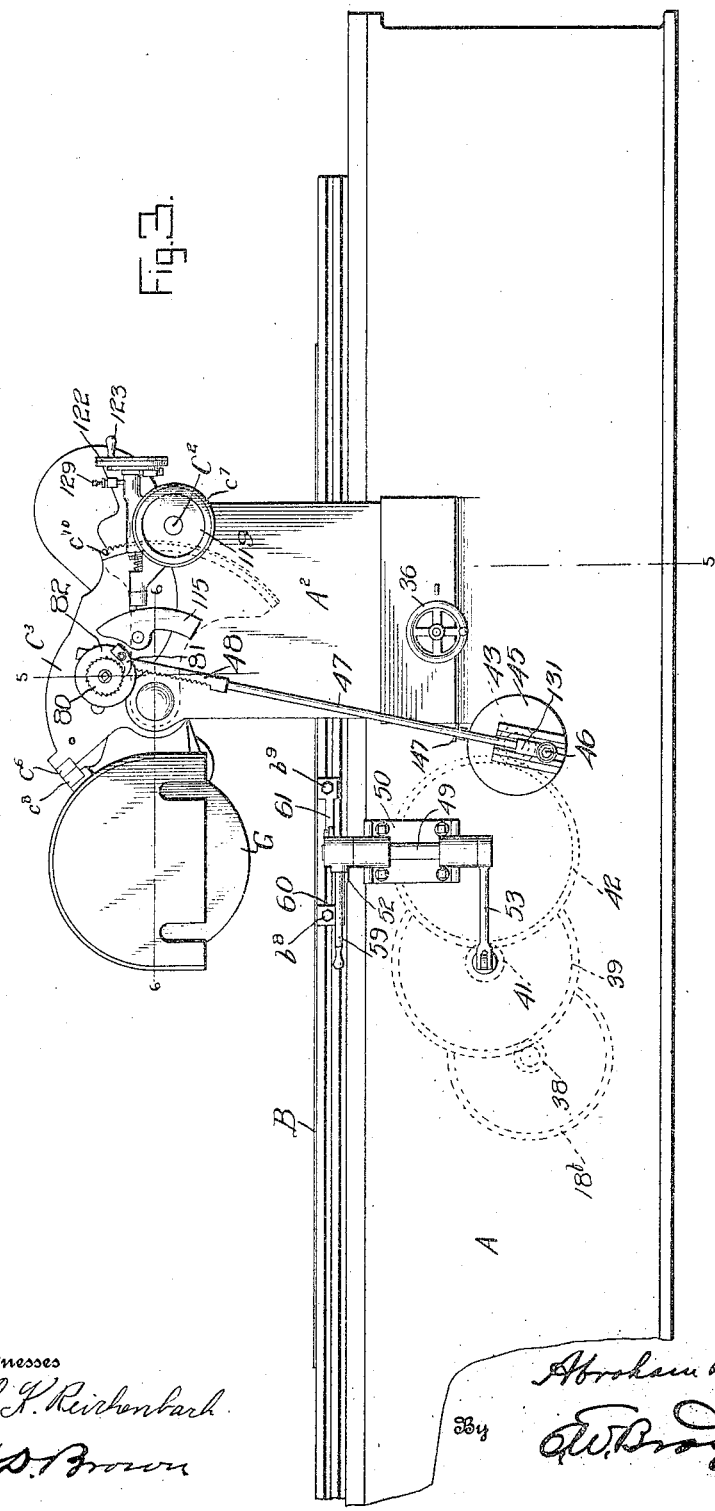

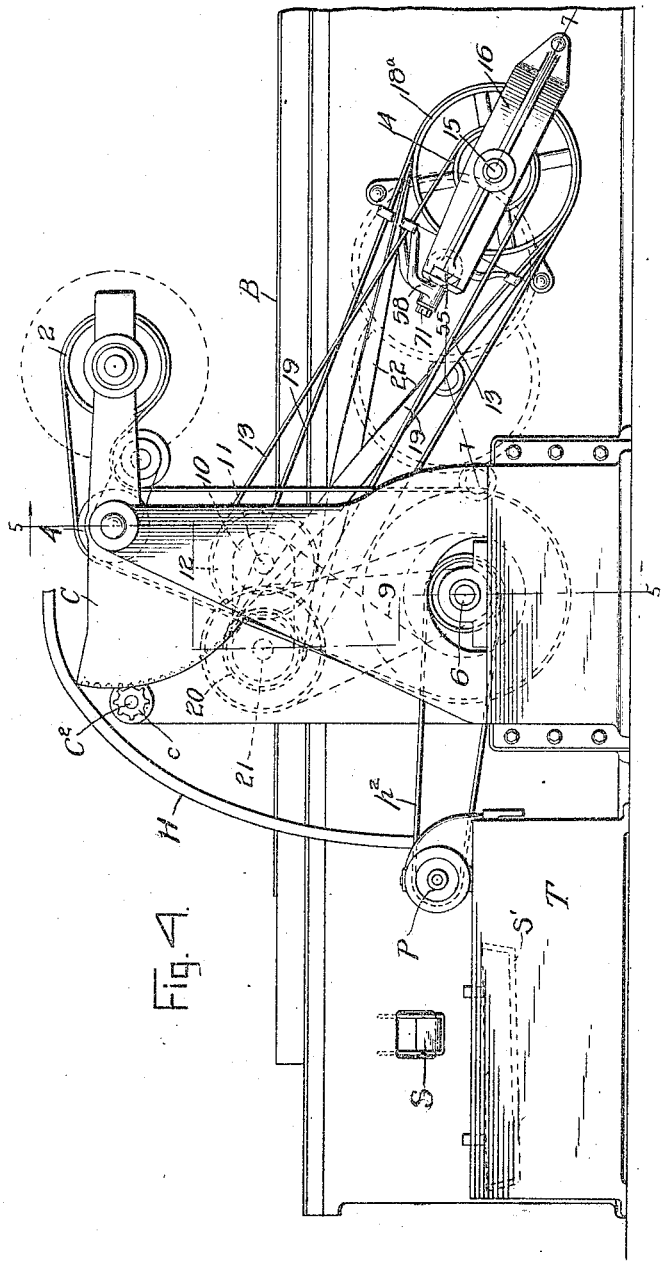

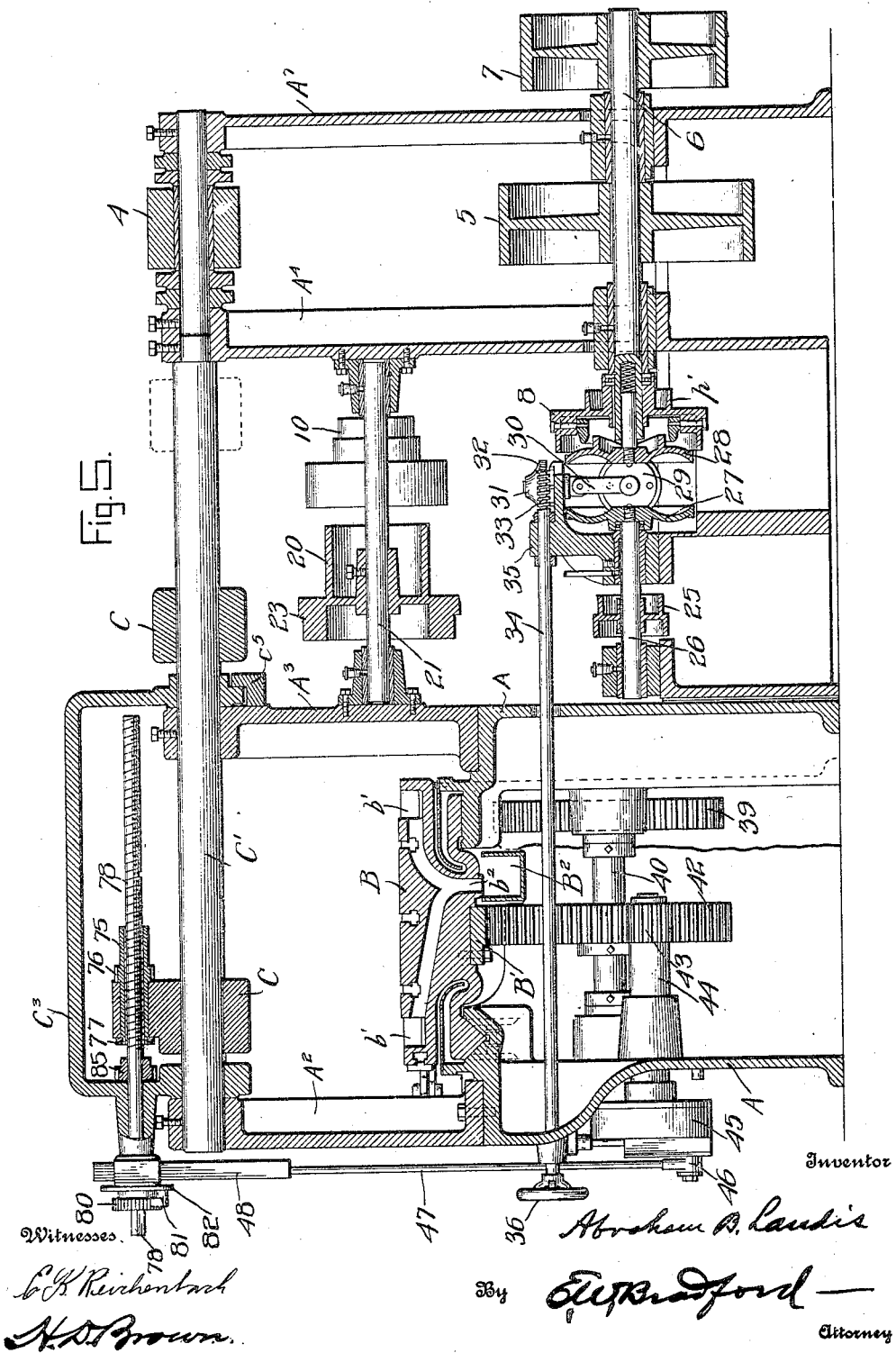

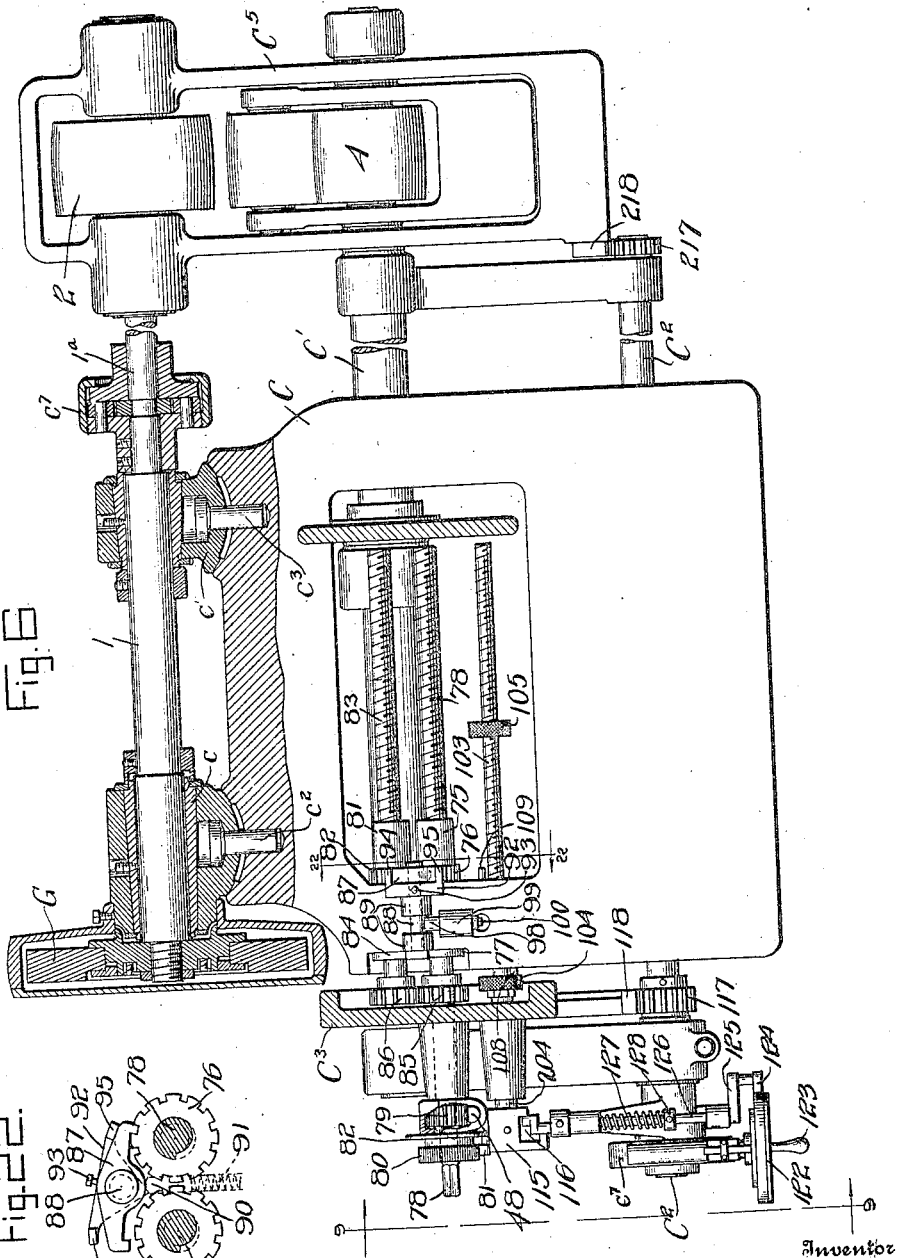

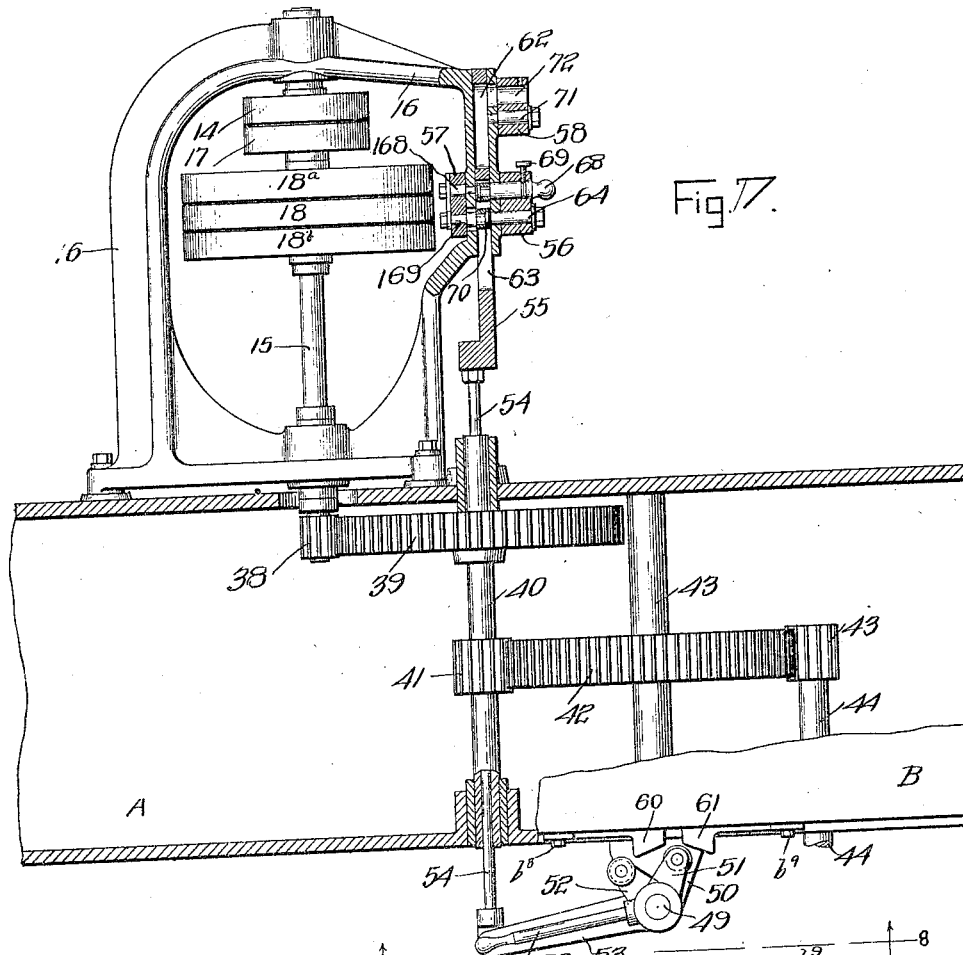
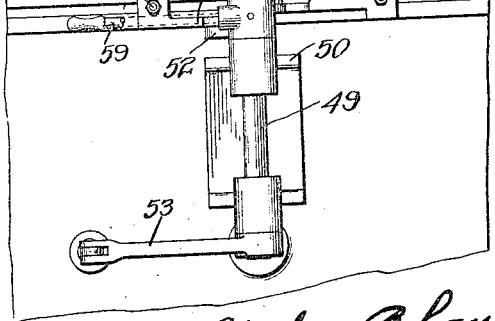

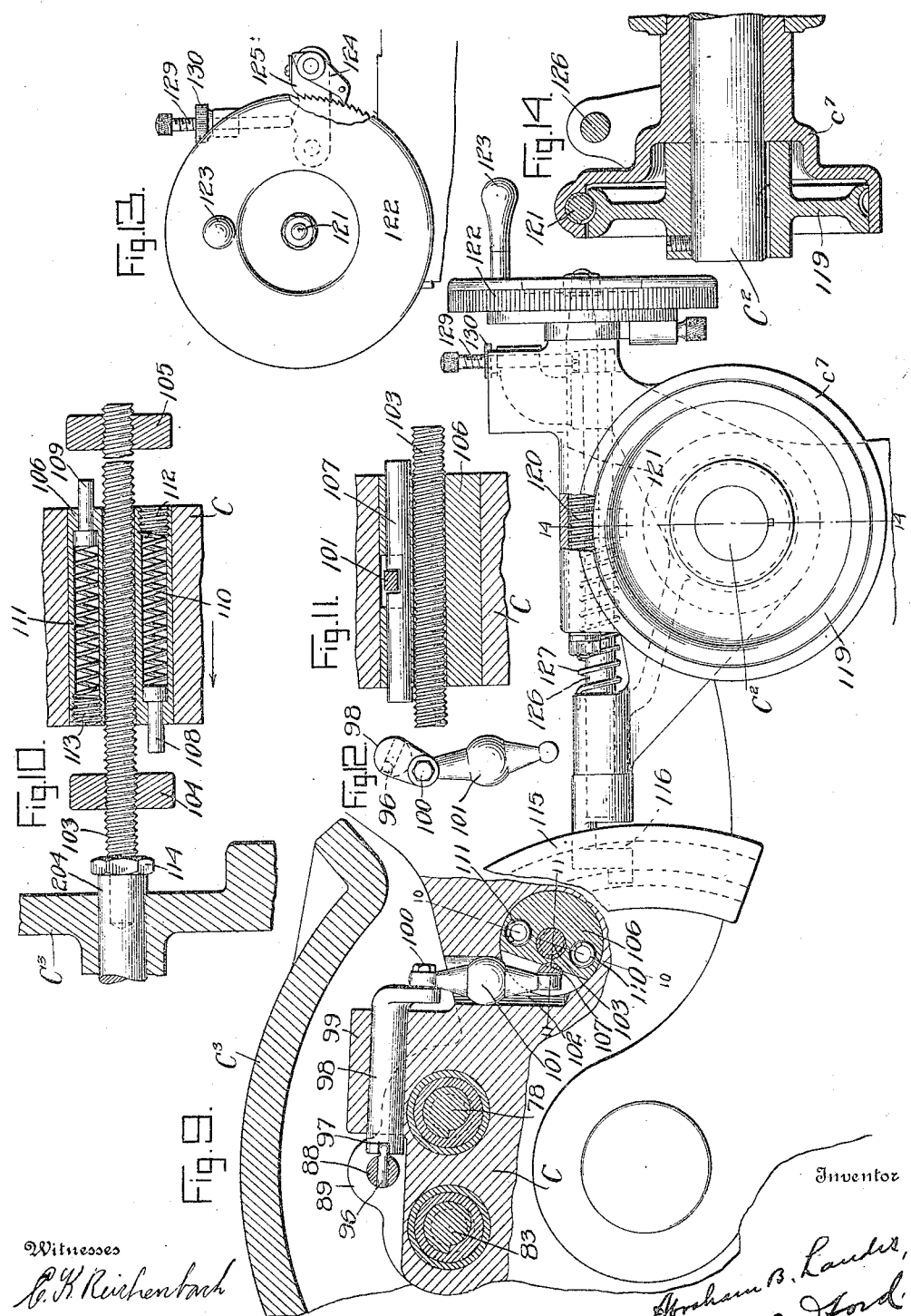

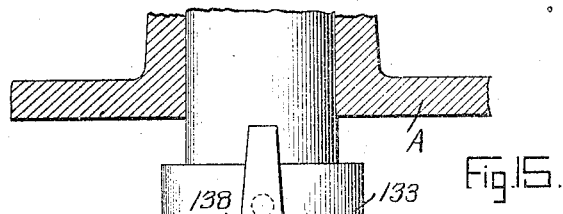
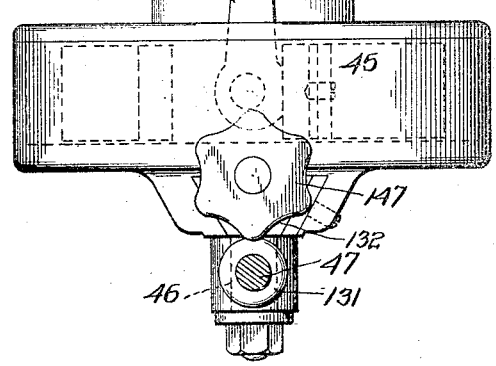
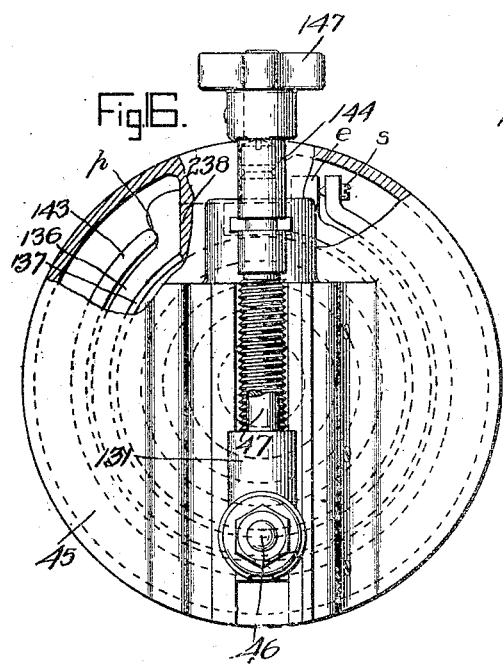
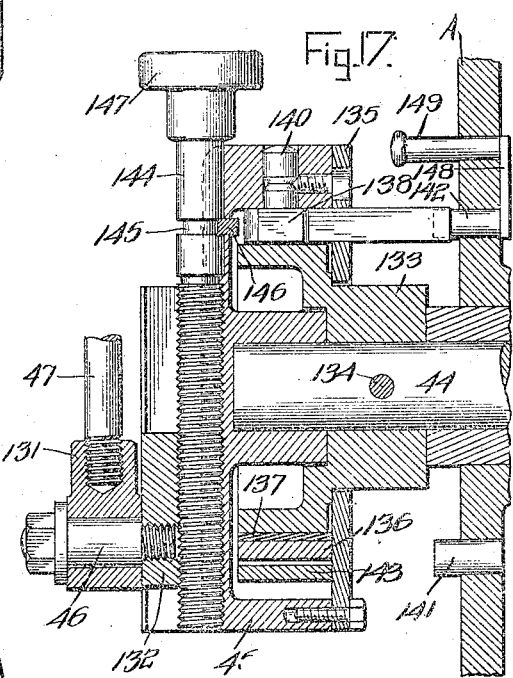

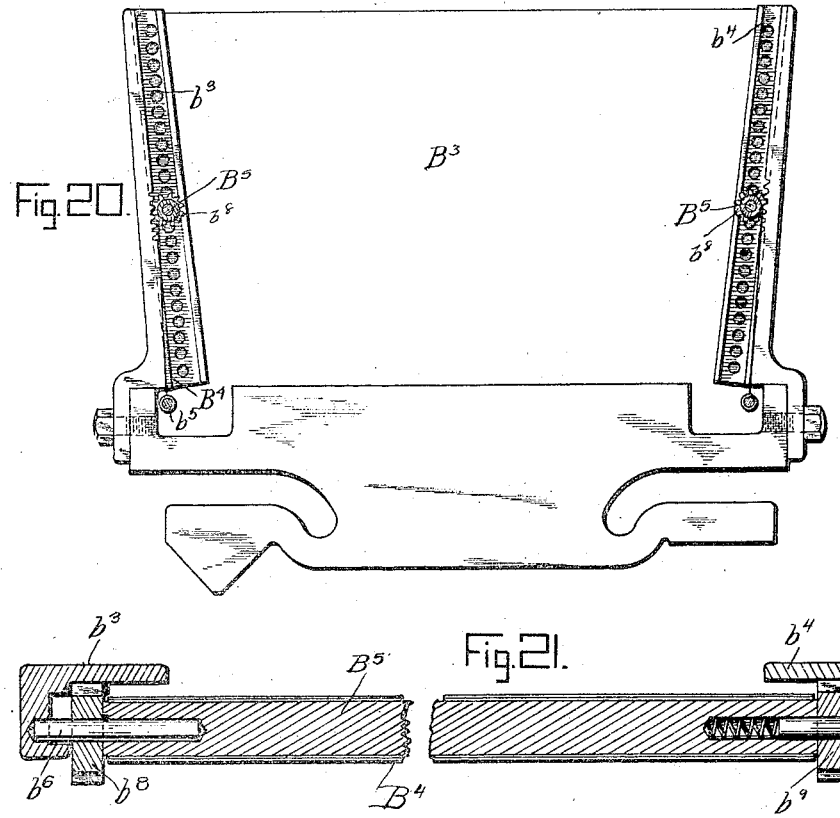

UNITED STATES PATENT OFFICE.

ABRAHAM B. LANDIS, OF WAYNESBORO, PENNSYLVANIA.

GRINDING-MACHINE.

1,015,567.

Specification of Letters Patent.    Patented Jan. 23, 1912.

Application filed November 20, 1909.  Serial No. 529,151.

*To all whom it may concern:*

Be it known that I, ABRAHAM B. LANDIS, a citizen of the United States, residing at Waynesboro, in the county of Franklin and State of Pennsylvania, have invented certain new and useful Improvements in Grinding-Machines, of which the following is a specification.

The object of my said invention is to provide a grinding machine for grinding plane surfaces which shall be automatic in the operation of its traversing and feeding mechanism and accurate and positive in its work, and it consists in various improvements in the construction and arrangement of parts of such a machine whereby these objects are accomplished, all as will be hereinafter more fully described and claimed.

Referring to the accompanying drawings which are made a part hereof and on which similar reference characters indicate similar parts, Figure 1 is a perspective view of the front side of a grinding machine embodying my said invention, Fig. 2 a similar view of the rear side, Fig. 3 an elevation of the front side of the machine, Fig. 4 an elevation of the rear side with a portion of one end of the bed broken away, Fig. 5 a cross section on the dotted line 5—5 in Figs. 3 and 4, Fig. 6 a horizontal section on the dotted line 6—6 in Fig. 3, Fig. 7 a detail horizontal section on the dotted line 7—7 in Fig. 4, Fig. 8 a detail elevation looking in the direction indicated by the arrows from the dotted line 8—8 in Fig. 7, Fig. 9 a detail view partly in section as seen when looking in the direction indicated by the arrows from the dotted line 9—9 in Fig. 6, Figs. 10, 11, 12, 13 and 14 detail views illustrating different parts of the mechanism shown in Fig. 9, Figs. 15, 16 and 17 detail views illustrating, on an enlarged scale, the crank-rod connection shown at the lower side of Fig. 1, Figs. 18 and 19 detail views illustrating the belt-shifting devices shown in Fig. 2, Figs. 20 and 21 detail views illustrating the water fenders used in connection with the grinding bed, and Fig. 22 a cross section on the dotted line 22—22 in Fig. 6.

In said drawings the portions marked A represent the bed or frame of the machine, B the work-carriage and C the pivoted frame carrying the grinding-wheel.

The bed or frame A is a hollow casting of suitable form and dimensions to support the various parts of the mechanism and contains the bearings and supports for the operating parts. It is formed on its top with longitudinal ways for the work-carriage B.

The work-carriage B is a table of appropriate form on which the work W (see Fig. 1) may be secured by clamps $b$ and is formed with longitudinal ribs on its under side of appropriate form to run in the ways formed therefor in the top of bed A. In the central portion of its under side it has a longitudinal rack-bar B′, secured thereto for engagement with the traversing gear. It is formed with appropriate side gutters $b'$ communicating through channels $b^2$ with a waste-water cutter $B^2$. At each end it is provided with an end-guard $B^3$ formed with upright side pieces $b^3$ and $b^4$. A series of perforations are formed in the inner faces of said upright side pieces at one end of the carriage and vertical grooves in the adjacent faces of the uprights are formed rack-bars. The construction on each side of the bed being a duplicate of the other only one side need be described. The water-guards consist of flexible curtains $B^4$ mounted at one end on a longitudinal rod $b^5$ extending from end to end of the work-table in the upper outside corner of each side gutter. Their upper edges are wound upon a roller $B^5$ which roller is mounted by means of pins $b^6$ and $b^7$ in its ends in corresponding perforations in the uprights $b^3$ and $b^4$. Pinions $b^8$ and $b^9$ are mounted on said pin $b^6$ and $b^7$ and engage with the teeth of the rack-bars formed adjacent to the perforations. As shown in Figs. 20 and 21 the water-guard curtains are adjusted to about one-half the height of the upright $b^3$ and $b^4$, the pinions being engaged in the rack-bars and the rollers held at the desired elevation by the engagement of their pins with the perforations. When it is desired to adjust said water-guards up or down, the roller $B^5$ may be slid toward the end containing the pin $b^7$, which is spring-mounted and adapted to slide sufficiently to disengage the pin $b^6$, when said roller can be rolled up or down with the pinion in engagement with the rack-bar, which insures an even adjustment of both ends of said roller. When the elevation desired has been secured the pin $b^6$ is allowed to reëngage with the adjacent perforation which will hold the roller at the point desired the other end being in position by engagement of the pinion with the rack-bar and the engagement of the pin $b^7$ behind the outside flange of the groove. In Figs. 1 and 2 I have shown the water guard curtain on one side as elevated and on the other side of the bed as lowered. It will be understood that any elevation desired for either side may be readily secured by the above described mechanism and the operator as well protected from the flying water which is constantly flowing onto the work.

The frame C is a casting of suitable shape to carry the parts mounted thereon and is pivoted on a pivot-shaft C' in bearings in the top of uprights $A^2$, $A^3$ and $A^4$ secured to the opposite sides of the bed A and to the transverse portion $A^5$ in said bed. The grinding wheel G is mounted on a shaft 1 journaled in suitable bearings in the front end of said frame. Said shaft is coupled by suitable and somewhat flexible coupling mechanism contained in casing $c^7$ to a shaft $1^a$ which is mounted to slide in bearings in a frame $C^5$ mounted on pivot-shaft $C^2$ between the standards $A^4$ and $A^7$ on transverse frame $A^5$. The rear end of said frame $C^5$ is weighted, as shown, so that it will nearly balance on said pivot-shaft. Another frame or hood $C^3$ is mounted on pivot-shaft C' between the standards $A^2$ and $A^3$, extending over the front part of frame C to cover the feeding mechanism and on its front has a bearing face or track $c^6$ against which a shoe $c^8$ on frame C is adapted to bear. The rear end of said frame C is weighted, as shown, the weight normally holding shoe $c^8$ against track $c^6$. A segment 118 is formed on the rear end of pivoted frame $C^5$ and a corresponding segment 218 on the rear end of hood $C^3$, both formed with gear teeth and in line with each other for engagement with pinions 117 and 217 on a shaft $C^2$, forming part of the adjusting gearing, to be hereafter described. Frame C is mounted not only to pivot, but also to traverse transversely on said shaft C' to carry the grinding-wheel step by step across the work, the traversing movement being effected at each end of the travel of the work-table, as will be presently described.

The grinding-wheel shaft 1 through shaft $1^a$ is belted by means of a pulley 2 on shaft $1^a$ and a belt 3 which runs over an idler pulley 4 on the pivot-shaft to a pulley 5 on the main driving shaft 6, which is provided with a belt pulley 7 by which the power for driving the machine is connected therewith. Said main driving-shaft 6 is connected by various belts and gearing to the driving shafts of the several sets of feeding mechanism so that the entire machine is operated from one main driving-shaft. Said main driving-shaft 6 is provided with a cone pulley 8 geared by a belt 9 to a cone-pulley 10 on a counter-shaft 11 journaled in suitable bearings on the frame. Another pulley 12 adjacent to cone-pulley 10 is connected by a belt 13 with a pulley 14 on a counter-shaft 15 mounted in bearings carried in a yoke 16 secured to the rear side of bed A. Adjacent to said pulley 14 an idler pulley 17 is mounted on said counter-shaft 15 and another pulley 18 of larger diameter is also mounted on said shaft with an idler pulley $18^a$ and $18^b$, respectively, of the same diameter on either side thereof. A straight belt 19 runs from said pulley 18, or is supported on an idler pulley alongside thereof, to a pulley 20 on a counter-shaft 21 journaled in bearings in the frame alongside shaft 11 and above the main driving-shaft 6. Another cross belt 22 is also mounted on said pulley 18, on one of the idler pulleys alongside thereof, on the shaft 15 and runs to said pulley 20. Said pulley 20 is also formed with a cone part 23 by which shaft 21 may be connected by a belt 24 with a cone-pulley 25 on shaft 26 mounted in bearings in the frame in line with the main driving-shaft 6 and connected thereto by differential gearing comprising friction disks 27 and 28 on the adjacent ends of said respective shafts and friction gear-wheels 29 engaging between said disks and carried upon a frame 30 swiveled upon a vertical shaft 31 on which is mounted a worm-wheel 32 with which a worm 33 on a rod 34 is adapted to engage. Said rod 34 is journaled in a bearing in a part of the frame 35 in which the vertical pivot 31 is also journaled and extends in horizontal direction through the bed A to the outside thereof where it is provided with a hand-wheel 36 by which it may be turned and the angle of the friction-wheels 29 in relation to the disks 27 and 28 adjusted in the well known manner for changing the speed of the shaft 26. On the inner end of shaft 15 is a pinion 38 arranged to mesh with a gear-wheel 39 on a hollow shaft 40 journaled in bearings in each side of the bed. A pinion 41 is also centrally mounted on said shaft 40 and meshes with a gear-wheel 42 on another cross shaft 43 journaled in bearings in the sides of the bed. Said gear-wheel 42 meshes with a pinion 43 on a shaft 44 journaled in bearings in one side of the bed and on the outer end of which is mounted a wheel casing 45 carrying a sliding crank-block 46 connected by a pitman rod 47 with a rack-bar 48 on its upper end with the mechanism to actuate the gearing for traversing the grinding-wheel carriage across the work. Said gear-wheel 42 also engages with the teeth of the rack-bar B' on the underside of the work-carriage B for traversing the same back and forth.

A vertical rock-shaft 49 is mounted in bearings in a bracket 50 secured to the side of the bed A and has angular projecting arms 51 and 52 extending from its top and in different planes and in line with the edge of the traveling carriage B. On its lower end it is provided with a crank-arm 53 which is pivoted at its outer end to the outer end of a rod 54 which is mounted to slide in the hollow shaft 40 extending through from one side of the bed A to the other end and connected to a bar 55 mounted to slide in a horizontal way in the rear side of yoke 16. Belt-shifting levers 56, 57 and 58 are pivoted on the slide portion of frame 16 and are provided with eyes on their outer ends through which the belts 13, 19 and 22 are threaded and by which said belts are shifted back and forth from the driving pulleys 14 and 18 to the idler pulleys alongside, on the shaft 15. A hand-lever 59 is provided on the top end of rock-shaft 49 by which it may be operated by hand, and dogs 60 and 61 are adjustably mounted in a longitudinal T-shaped groove in the edge of table B being secured by clamping bolts $b^8$ and $b^9$ and arranged one in the path of the anti-friction roller on the outer end of the arm 51 and the other in the path of the anti-friction roller on the outer end of arm 52, whereby they are adapted to strike said arms as the carriage passes, and one as it moves in one direction and the other as it moves in the other direction, and through the said rock-shaft 49, lever 53 and rod 54 slide the bar 55, moving the shifting levers 56, 57 and 58 to shift the belts and reverse the motion of the machine.

By referring particularly to Figs. 7, 18 and 19, as well as Figs. 2 and 4, the means for operating the shifting levers will be understood. The bar 55, as shown most clearly in Fig. 18, is formed with cam slots 62 and 63, the outer ends of which are in a different horizontal plane from the inner ends, an angular off-set being formed in said slots between their extreme end portions. The lever 56 is mounted on a pivot 64 which pivot has an anti-friction roller 65 mounted to run in the groove 63 of the bar 55. Said lever 56 is in the form of a bell-crank lever, with a horizontally extending arm 66 on its lower end formed with a perforation 67 in which a pin 68 may be inserted so that its inner end will project into said slot 63. A set-screw 69 is provided in the side of the arm the inner end of which is adapted to engage with a groove in said pin 68 for securing it in the correct position. Lever 57 is pivoted on the backside of the front bar of yoke 16 on a pivot-bolt 168 and has a horizontal arm extending outwardly from said pivot in which is mounted a bolt 169 having an anti-friction roller 70 on its inner end which projects into the slot 63 of the bar 55. The lever 58 is pivoted on the front side of the yoke 16 on a pivot bolt 71 and has a perforation 72 in a horizontal projection alongside said pivot bolt into which the pin 68 may be inserted when desired, as will be presently described.

Pulley 18 on shaft 15 being a fast pulley and pulleys $18^a$ and $18^b$ being loose on said shaft and pulley 14 being fast and pulley 17 loose, it will be seen that the operation of the carriage back and forth can be controlled so as to travel in both directions under the same speed, or travel, in one direction slowly and be returned rapidly, as follows: When it is desired to traverse the carriage back and forth at the same speed, belt 13 will be thrown upon the loose pulley 17. The shifting lever 58 will be in the position shown in Fig. 18 and the pin 68 inserted in the perforation 67 of the horizontal arm 66 of the lever 56. As the carriage reaches the limit of its movement and operates through the dog 60, or 61, mounted thereon to rock shaft 49, and through the lever 53 to reciprocate the rod 54 and the sliding bar 55, it will be seen that the shifting levers 56 and 57 will be thrown at each reversal of the carriage to throw the belts 19 and 22 first one and then the other to the central driving pulley 18 and the one not driving to the appropriate loose pulley $18^a$ or $18^b$, so that first the carriage will be driven directly by the belt 19 and then reversely by the cross belt 22, traversing back and forth at the same speed in each direction, which speed may be varied by turning rod 34 by hand-wheel 36 which will operate the differential gear in the well known manner. When it is desired to grind in one direction only the large pulley 18 may be used as the driving pulley for driving the carriage while the grinding wheel is in operation and the small pulley 17 will be used as the driving pulley for returning the carriage quickly and when this arrangement is used the pin 68 is removed from the perforation in the horizontal arm of the lever 56 and inserted in the perforation in lever 58 so that the inner end of said pin will engage with the slot 63 in the sliding bar 55. In this arrangement the lever 56 is thrown to carry belt 19 onto the idler pulley $18^b$ where it will remain, the crank-pin 68 of the crank-arm 66 of said lever having been removed. Said pin 68 having been inserted in perforation 72 with its inner end in slot 62 of bar 55, the horizontal arm of the lever 58 now becomes a crank-arm and the pin 68 its crank-pin so that a reciprocating movement of the bar 55 operates through the cam slot 62 to swing said lever 58 at each movement of said bar and throwing the belt 13 back and forth from the idler pulley 17 to the fast pulley 14, the shifting arm 57 being also moved simultaneously therewith to carry the belt 22 back and forth from the fast pulley 18 to the loose pulley $18^a$.

In the operation of the grinding wheel carriage transversely of the work-table, as before stated, the frame C carrying the grinding wheel is mounted to slide transversely upon the pivot-shaft C', which is fixed in bearings in the tops of the brackets A², A³ and A⁴ of the frame. Said frame C is of a form which will be best understood by an examination of Fig. 6 being formed with a central opening and having bearing-blocks c and c', in which the bearings for the grinding wheel shaft are formed, secured to its forward end by a ball-and-socket arrangement, whereby said bearings may be readily alined and adjusted, the bearings being secured by screw-bolts c² and c³. The rear end, as before stated, is weighted to counter-balance the grinding wheel shaft and practically counter-balance the frame and hold the shoe c⁸ thereon in contact with the track c⁶; and balance all the other mechanism pivoted upon said pivot-shaft C'. In the part of the frame immediately above said shaft C' it is formed with an upward projection having a transverse perforation in which is mounted a sleeve 75. A pinion 76 is formed on said sleeve adjacent to one face of the part of the frame C and a nut 77 is mounted on its outer end, whereby said sleeve is held from longitudinal movement in said frame. Said sleeve is interiorly screw-threaded and a screw-rod 78 is mounted therein. The outer end of said rod extends through a horizontal perforation in the adjacent side of a hood C³ and has a pinion 79 loosely mounted thereon with which the rack-bar 48 on the rod 47 engages. On the extreme outer end of said rod 78 it is provided with a ratchet-wheel 80, fast therewith, with which the point of a spring pawl 81 engages. Said pawl 810 is pivoted on a disk 82 secured to the hub of pinion 79. Alongside sleeve 75 another similar sleeve 81 is mounted having a pinion 820 bearing against the inner face of the frame and a nut 84 bearing against its opposite face to hold said sleeve from longitudinal movement while permitting its rotary movement. Said sleeve is also interiorly screw-threaded and a screw-threaded rod 83 is mounted therein extending parallel to the screw-threaded rod 78, but the sleeve 810 and rod 83 are threaded in the reverse direction to sleeve 75 and rod 78. Said rods 78 and 83 are geared together by intermeshing pinions 85 and 86 secured just within the hood C³. A double ended pawl 87 is pivoted to tilt independently on a short rock-shaft 88 which is journaled in bearings formed in lugs 89 on the top of frame C above and midway between screw-rods 78 and 83. Said pawl is mounted to swing freely on said shaft 88 and provided on opposite ends with angular points which are adapted to engage with the teeth of one or the other of the ratchet wheels 76 and 82 on screw-threaded sleeves 75 and 81 on the screw-shafts 78 and 83. The underside of said rocking pawl is formed V-shaped in cross section and a spring-mounted plunger 90 is held upwardly against the face on one side or the other of its point by means of a spring 91 so that one end or the other of said pawl will at all times be held into engagement with one or the other of said ratchet-wheels, which will thus be held from turning and hold its sleeve to serve as a nut in which its screw-rod 78 or 83 will operate to feed the frame C back and forth upon the pivot-shaft C'. An arm 92 is secured rigidly on said rock-shaft 88 by means of a set screw 93 (see Figs. 6 and 22) and is formed with transversely extending fingers 94 and 95 which project over the outer ends of the rocking pawl 87. Said arms 94 and 95 are somewhat higher than the backside of the pawl where they contact therewith so that arm 92 may rock slightly independent of said pawl. Said rock-shaft 88 is provided with a transverse pin 96 (see Figs. 6, 9, 10 and 11 for the details about to be described) the head of which projects out to one side thereof and engages with a transverse slot 97 in the adjacent end of a rock-shaft 98, which is mounted in a bearing in a perforation in a boss 99 formed on top of frame C and extending at right angles to the bosses 89 so that said rock-shaft 98 extends at right angles to the rock-shaft 88. On the outer end of said rock-shaft 98 it is provided with a crank having a crank-pin 100 which is pivoted to the upper end of a lever 101 formed ball-shaped in its center and mounted in a vertical socket 102 in an adjacent part of the frame C. Another screw-rod 103 is mounted rigidly in a socket in the inner end of a rod 204 secured to have a limited sliding movement in a perforation in the adjacent end of the hood C³. Said rod is provided with adjustable stop nuts 104 and 105 near the respective ends thereof and on opposite sides of the arm of the frame C through which the same extends. A cylindrical block 106 is mounted in a perforation in said arm of frame C and secured to move therewith in which is mounted a sliding rod 107 which extends through a perforation in said block to a short distance beyond each end thereof. Said rod 107 has a vertical notch in one side of its center with which the lower end of lever 101 engages. On opposite sides of said screw-rod 103 are formed other longitudinal sockets in said block 106 (Fig. 10) extending from the opposite ends of said block in reverse directions to nearly the other end, and from their inner ends smaller perforations lead through to the opposite ends. Plungers 108 and 109 are mounted to slide in said smaller perforations, each plunger being formed with a head and inserted from the large ends of the sockets so that said heads are on the interior.

Coiled springs 110 and 111 are mounted between the respective heads of said plungers and screw-plugs 112 and 113 inserted in the outer ends of said sockets. Said plungers 108 and 109 are in a position to contact with the stop nuts 104 and 105 on rod 103 as the carriage C traverses back and forth and are adjusted in position to reverse the transverse feed of the carriage at the point desired in the following manner: The parts being in the position shown in Fig. 10 and the carriage moving in the direction indicated by the arrow, plunger 108 will contact with stop nut 104 and under the tension of spring 110 will shove the sliding rod 204 and the screw-rod 103 endwise until the nut or shoulder 114 thereon will contact with the face of the part $C^3$ which will limit the longitudinal movement when spring 110 will compress until nut 104 will contact with the projecting end of sliding rod 107, which will operate to tilt lever 101 on its central ball-bearing, rocking shaft 98 through the crank connection therewith and by the engagement of the end of pin 96 with the transverse slot 97 on one side of the center of said rock-shaft will operate to rock shaft 88 and throw the arm 92 to contact with the disengaged end of the pawl 87, rocking said pawl to disengage the end which has been in engagement and to throw the point of its angle on its underside across the point of the plunger 90, which, under the pressure of spring 91, will quickly throw the opposite end of said pawl into engagement with the other ratchet-wheel, thus locking one nut 75, or 81, and releasing the other, throwing the screw that has been idle into operation, which serves to move frame C transversely thus reversing its direction. By adjusting nuts 104 and 105 the time of reversing may be regulated to suit the work, as will be readily understood.

On the outer end of sliding part 204, carrying the screw-rod 103, is mounted a block 115, in the outer face of which is formed a vertical notch or recess 116. On the shaft $C^2$ are mounted pinions 117 and 217 engaging with the teeth on the curved rack-bars 118 and 218 on the rear edges of the hood $C^3$ and frame $C^5$ respectively. Said shaft $C^2$ has a worm-gear 119 on its outer end within a shell, or casing, $c^7$ with which a worm 120 on a transversely extending shaft 121 is adapted to engage. Said shaft 121 is journaled in bearings formed on the top of casing $c^7$ and has a crank-wheel 122 on its outer end, provided with a crank-pin 123 by which it may be operated. The periphery of said wheel is formed with fine notches, or serrations, and a pawl 124 on the outer end of a crank 125 on a crank-shaft 126 engages therewith. Said crank-shaft 126 is journaled in bearings formed on the top of the hub of the casing $c^7$ and on its inner end is formed with a crank which engages in the vertical recess in the adjacent side of block 115 on the outer end of sliding rod 204. A spring 127 is connected at one end to said shaft by a collar 128 secured thereon by a set-screw the other end of said spring engaging in the end of the bearing in which said shaft is journaled, the tension of the spring being adjusted to throw the arm 125 carrying the pawl 124 upwardly its upward motion being limited by a stop screw 129 mounted in a screw-threaded perforation and adapted to be adjusted and secured by a jam nut 130 thereon.

The lower end of rod 47 is formed screw-threaded and inserted in a screw-threaded perforation in a block 131 which is pivoted on the crank-pin 46 mounted in block 132, which is mounted to slide in a dove-tail shaped slot in the face of casing 45 mounted on the outer end of shaft 44. The connection between shaft 44 and casing 45 is as follows: (See Figs. 15, 16 and 17.) A wheel 133 is secured rigidly to said shaft by a pin 134. Casing or frame 45 is formed with a flange surrounding said wheel and a plate 135 is secured thereon which engages back of a shoulder in said wheel 133. Mounted in an annular recess between said wheel 133 and the inner face of the flange of the frame is a circular flexible brake 136 adapted to impinge upon the face of said wheel 133, being faced with leather or other friction material 137. One end of said brake bears against a shoulder 238 within said casing and the other end bears against a cam on one end of a pivot cam-lever 138. Said lever is mounted upon a pivot bolt 140 in said frame and its outer end extends rearwardly into the path of a strike 141 on bed A to one side of the axis of shaft 44 and a sliding strike 142 on the other side. A leaf-spring 143 surrounds said brake on its outside with one end bearing at a point $p$ under a flange on the stationary end of said brake while its other end is provided with a set-screw $s$ adapted to screw against the projecting end $e$ of said brake, by which the tension of said spring may be regulated to secure the grip desired for said brake. The sliding block 132 is adjustable radially by means of a screw 144 engaging on one side with screw-threads in the casing 45 and on its other side with screw-threads in said sliding block. Said screw 144 is formed with a circumferential groove 145 with which a key 146 engages and holds it from longitudinal movement. It will be seen, therefore, that by the turning of said screw through the medium of the hand-wheel 147 the position of said block 132 in relation to the axis of shaft 44 may be regulated to secure the length of throw desired for the rod 47. Stop 142 is connected by a bar 148 with a handle 149 by which said stop may be slid out through the side of bed A in which it is mounted so that it can be moved to either be in the path of said lever 138 or out of its part as follows:

In the operation of the machine, when it is desired to feed the grinding wheel transversely of the work at each end of the longitudinal movement of the work-carriage, said strike 142 will be slid in to escape lever 138. Then, during the operation of shaft 44 through the medium of the gear connecting it to the gear-wheel 42, which operates the work-carriage, the casing 45 is revolved and being held to the wheel 133 by the brake 136 will revolve with the shaft 44 until said lever 138 contacts with strike 141. Said strike will throw said lever on its pivot 140 and through the cam, bearing against the end $e$ of said brake, will open said brake against the action of the spring 143 and release the casing 45 from driving contact with the wheel 133, which will continue to revolve until the direction of the work-carriage is reversed by the contact of one of the dogs 60 or 61 thereon with one of the arms 51 or 52 on the rock-shaft 49, and the shifting of the belts and reversal of the movement of the carriage, as before described. As soon as the carriage starts in the reverse direction shaft 44 also starts to rotate in the reverse direction and the lever 138 is moved away from stop 141 when the spring 143 will close the brake 142 onto the wheel 133, which will then turn casing 45 to operate the rod 47, the rack-bar 48, and the other parts of the mechanism for feeding the grinding wheel across the work. Thus when stop 142 is out of operation said casing 45 makes a complete revolution at each movement, carrying said rod 47 both up and down, which will feed the grinding wheel transversely of the work one step at each reversal of the work-carriage B. When it is desired to traverse the grinding wheel to grind during the travel of the carriage in one direction only, stop 142 is slid outwardly so that it will also contact with lever 138 when, in a like manner, the brake will be released from engagement with the wheel 133 at the half revolution of shaft 44 so that said rod 47 will be operated, only in one direction, either up or down, at each reversal of the carriage. Thus when the carriage starts to reverse in the grinding direction the crank will pull said rod down and feed the wheel over transversely of the work and when the carriage starts back to the other end of the work the casing 45 will make a half revolution to slide said rod 45 upward ready to engage and traverse the grinding wheel when the carriage is again reversed at the starting end.

At each reversal of the mechanism for traversing the grinding wheel transversely of the work the crank-rod 126 is operated to turn the wheel 122 and through the worm 120 turn the wheel 119 and the shaft $C^2$ carrying the pinions 117 and 217, which engage with the toothed racks on the outer rear ends of the pivoted hood $C^3$ and the frame $C^5$ and operate to lower track $c^6$ and feed the grinding wheel down one step into the work. Thus at each longitudinal movement of the work-carriage the grinding wheel may be moved one step across the work and at each point of reversal of the movement of the grinding-wheel carriage said grinding-wheel is fed one step into the work the operation continuing continuously and automatically until the results desired have been accomplished.

The general operation of the machine may be recapitulated, as follows: The power is applied to driving shaft 6 and through the system of belts before described to the counter-shaft 15. By the arrangement of the shifting levers, belts 13, 19 and 22 may be shifted back and forth on the driving pulleys 14 and 18 and the idler pulleys 17, $18^a$ and $18^b$ to secure the driving of said shaft 15 and the reversal of its motion, the speed in both directions being the same when driven through the belts 19 and 22 and the speed in one direction being slow and in the other direction fast when driven through the medium of the belts 13 and 22. The differential gear connecting shafts 6 and 26 enables the speed to be varied when driven through the belts 19 and 22. The connection between shaft 15 and the gearing for traversing the work-carriage back and forth and also for the operation of shaft 44 has been fully described and need not be repeated. The belt for driving the grinding-wheel has also been before traced in its course from the main driving-shaft 6 and it will be noted by an examination of Fig. 2 that said grinding wheel shaft $1^a$ is connected by a spline with its pulley 2 and thus provision is made for the transverse movement of the grinding wheel frame, as operated from the shaft 44 through the medium of the reciprocating rack-bar 48 on the upper end of pitman rod 47. The rack-and-pinion connection between the segment on the rear edges of the hood $C^3$ and the frame $C^5$ insure an even movement of the grinding wheel shaft 1 and the section $1^a$, but any variation is provided for by the flexible coupling by which said two shafts are coupled together.

As is usual, in this class of machinery, provision is made for carrying water to the work from a tank T located in the bed thereof, a pump P being provided for this purpose driven by a belt $p^2$ from a face $p'$ on the driving pulley 8. The water is carried through a hose H and branches $h$ $h'$ and $h^2$ to be discharged adjacent to the grinding wheel onto the work in the usual manner. The water running through the various gutters in the frame is collected and discharged through a spout S into the tank T, being strained through a strainer S' and used over again.

Having thus fully described my said invention, what I claim as new and desire to secure by Letters Patent, is:

1. A grinding machine comprising a frame or base, a work-carriage mounted to traverse thereon, a pivoted frame mounted above said work-carriage, a grinding wheel shaft journaled in bearings on said pivoted frame, means for tilting said frame on its pivot to adjust the grinding wheel toward and from the work, an automatic feeding mechanism connected with said means, means for traversing the work-carriage, gearing connecting the several parts with the power shaft, and said power shaft, substantially as set forth.

2. A grinding machine comprising a base provided with suitable bearings and supports for the other parts of the mechanism, the work-carriage mounted to traverse on said base, a grinding wheel frame pivoted above said work-carriage, a grinding wheel mounted on a shaft journaled in said pivoted frame, means for feeding said frame step by step transversely of the work, means for feeding the wheel into the work, means for traversing the work-carriage, gearing connecting the several sets of mechanism with a driving shaft, and said driving shaft, substantially as set forth.

3. A grinding machine comprising a base provided with a track for the work-carriage and appropriate bearings and supports for the other parts of the mechanism, a work-carriage mounted to traverse on said base, a grinding wheel frame pivoted on suitable supports on said base, means for traversing said grinding wheel frame transversely of the work, a grinding wheel with its shaft journaled in said frame, means for feeding said grinding wheel to the work, means operated by the work-carriage for controlling the feed of said wheel, gearing connecting the several sets of mechanism with a driving shaft, and said driving shaft, substantially as set forth.

4. A grinding machine comprising a base provided with suitable bearings and supports for the various parts, a work-carriage mounted to traverse on said base, means for traversing said carriage, a grinding wheel frame pivoted on supports adjacent to said work-carriage, a grinding wheel on a shaft journaled in bearings on one side of the pivot of said frame, a balancing weight on the other side of the pivot of said frame, means for feeding said grinding wheel to the work, means for traversing said grinding wheel across the work, gearing connecting the several sets of mechanism to a driving shaft, and said driving shaft, substantially as set forth.

5. A grinding machine comprising a base provided with suitable bearings and supports for the other parts, a work-carriage mounted to traverse thereon, a pivoted and substantially balanced grinding wheel frame mounted thereon, a grinding wheel carried by said pivoted frame, means for adjusting said wheel in relation to the work and means for moving said wheel transversely of the work, substantially as set forth.

6. A grinding machine comprising a base, a work-carriage mounted thereon, a grinding wheel frame pivoted on supports adjacent to said work-carriage carrying the grinding wheel on one end and a counterbalancing weight on its other end, an automatic feed mechanism for feeding the grinding-wheel across the work step by step and for feeding it into the work step by step at each reversal of the carriage, and driving mechanism, substantially as set forth.

7. A grinding machine comprising a base provided with suitable supports and bearings for the other parts, a work-carriage mounted to traverse longitudinally on said base, a pivoted grinding wheel frame mounted adjacent to said base and formed with a bearing face or shoe, a pivoted hood or frame mounted adjacent to said grinding wheel frame and provided with a track against which said shoe may bear, an overbalancing weight for holding said shoe in contact with said track, means engaging with one end of said hood or frame for adjusting it and securing it in adjusted position on its pivot, the grinding wheel carried on said grinding wheel frame, and the various operating mechanisms, substantially as set forth.

8. A grinding machine comprising a base provided with suitable bearings and supports for the other parts, a work carriage mounted to traverse thereon, a grinding wheel frame mounted to pivot and traverse transversely of the work-carriage, a grinding wheel carried on one end of said frame, a weight for normally holding said grinding wheel away from the work, a pivoted frame adjacent to said grinding wheel frame formed with a face against which a part of said grinding wheel frame may bear and slide, segmental racks on the opposite end of said pivoted frame, a shaft, pinions on said shaft engaging with said segmental racks, gearing for turning and holding said shaft to adjust said frame to feed the grinding wheel to the work, and mechanism for operating the several parts, substantially as set forth.

9. A grinding machine comprising a base provided with suitable bearings and supports for the several parts, a work-carriage mounted thereon, a grinding wheel frame pivoted adjacent to said work-carriage and provided with an over-balancing weight on one end, a grinding wheel mounted on its opposite end, a rocking frame mounted adjacent to said grinding wheel frame adapted to bear against the same for holding it against the weight, means for rocking said frame to adjust the grinding wheel to the work, and mechanism for operating the various parts of the machine, substantially as set forth.

10. A grinding machine comprising a base provided with suitable bearings and supports for the various parts, a work-carriage, a grinding wheel frame mounted to pivot and slide on a shaft transversely of the work-carriage, the grinding wheel mounted on a shaft carried by said frame, said shaft mounted to slide in bearings and through a driving pulley, said driving pulley connected thereto by a sliding connection, means for adjusting said grinding wheel toward and from the work, and mechanism for operating the several parts, substantially as set forth.

11. A grinding machine comprising a base provided with suitable bearings and supports for the various parts, a work-carriage mounted to traverse back and forth upon said base, gearing connected with said work-carriage for traversing it in either direction, shifting mechanism for throwing the gearing into action for traversing it in either direction, a trip lever for operating said shifting mechanism arranged to be operated by the movement of the carriage, means connected with said carriage for operating said trip lever, a grinding wheel, a grinding wheel frame, and means for pivoting said frame above the work, substantially as set forth.

12. A grinding machine comprising a base provided with suitable bearings and supports for the various parts, a work-carriage mounted to traverse back and forth thereon, traversing mechanism, means for reversing the motion of said traversing mechanism, said means comprising a counter-shaft carrying a multiple series of fast and loose pulleys of various sizes, belts running therefrom to the driving shaft, and means for shifting the driving belts from the fast pulleys to the loose pulleys either on the same series or different series, whereby the carriage may be driven at the same speed in both directions or one speed in one direction and another speed in the reverse direction, substantially as set forth.

13. A grinding machine comprising a base provided with suitable bearings and supports for the various parts, a work-carriage mounted to traverse thereon, gearing for traversing said carriage, means for reversing the direction of the motion of said gearing comprising a counter-shaft carrying a series of fast and loose pulleys part of which are of one size and part of which are of another size, a series of belts mounted on said pulleys and running to the driving shaft, part of said belts being geared to drive in one direction and part to drive in the reverse direction, and means for throwing a driving belt on a fast pulley of either size and leaving the other belts on the loose pulleys, substantially as set forth.

14. A grinding machine comprising a base provided with suitable bearings and supports for the various parts, a work-carriage mounted to traverse back and forth thereon, gearing for traversing the carriage comprising a counter-shaft geared to the carriage operating mechanism, a series of fast and loose pulleys thereon part of which are of one size and part of which are of another size, belts connecting said pulleys to the driving shaft, pivoted shifting levers for controlling the position of said belts in relation to the pulleys, said levers being provided with angle arms carrying projecting parts adapted to engage with cam slots in a sliding operating bar, said sliding operating bar, a trip lever connected with said bar, said lever being located adjacent to the carriage, and dogs adjustably secured to said carriage for contact with said lever to operate the same, substantially as set forth.

15. A grinding machine comprising a base provided with suitable bearings and supports for the various parts, a work-carriage mounted thereon, means for traversing said work-carriage back and forth, a grinding wheel frame pivoted on a shaft mounted in supports on said base and adapted to slide thereon, a screw engaging with a nut mounted in said frame for adjusting it transversely, a pawl-and-ratchet connection on the outer end of said screw, a reciprocating rack-bar for operating said pawl and through said pawl the ratchet and screw, said reciprocating rack-bar being connected to a crank on a shaft operated by the carriage operating gear, said shaft, and means for operating the same, substantially as set forth.

16. A grinding machine comprising a base provided with suitable bearings and supports for the various parts, a work-carriage mounted thereon, gearing for traversing said carriage back and forth, a grinding wheel frame mounted to pivot and slide on a transverse shaft adjacent to said work-carriage, a transverse screw engaging with a nut carried by said frame for adjusting said frame transversely, and means connected with the gearing for traversing the carriage for operating said screw, substantially as set forth.

17. A grinding machine comprising a base provided with suitable bearings and supgrinding wheel frame, substantially as set forth.

24. A grinding machine comprising a base provided with suitable bearings and supports for the various parts, a work-carriage mounted thereon, means for traversing said work-carriage back and forth, a grinding wheel frame mounted to pivot and slide on a transverse shaft adjacent to said work-carriage, screws engaging with loosely mounted nuts in said grinding wheel frame, means for locking said nuts interchangeably comprising a double ended pivoted pawl, gearing connecting said screws, gearing for driving said screws at each reversal of the work-carriage, and means for operating said pawl at the desired point comprising an adjustable strike carried on a frame adjacent to the grinding wheel frame and connected to rock the shaft carrying said pawl, and means connected with the same mechanism for feeding the grinding wheel to the work, substantially as set forth.

25. A grinding machine comprising a base provided with suitable bearings and supports for the other parts, a work-carriage thereon, a grinding wheel frame mounted to slide and pivot on a supporting shaft adjacent to said carriage, screws for sliding said grinding wheel frame on said supporting shaft, nuts loosely carried by said frame with which said screws engage, a pawl mounted on a rock-shaft for engaging and locking said nuts interchangeably, an adjustable strike adjacent to the frame arranged to rock said shaft and throw said pawl to lock said nuts interchangeably at pre-determined points in the transverse movements of said frame, and mechanism for operating the several parts, substantially as set forth.

26. A grinding machine comprising a base provided with bearings and supports for the other parts, a work-carriage thereon, a grinding wheel frame mounted to slide on a supporting shaft adjacent to said carriage, loosely mounted nuts carried by said frame, operating screws geared to run in opposite directions and mounted in said nuts, means for locking said nuts from rotation, interchangeably, and means for operating said locking means connected to be operated by the movement of the frame at predetermined points, substantially as set forth.

27. A grinding machine comprising a base provided with suitable bearings and supports for the various parts, a work-carriage mounted to traverse back and forth thereon, means for traversing said work-carriage, a grinding wheel frame mounted to pivot and slide on a transverse shaft adjacent to said work-carriage, screws for sliding said grinding wheel frame on said supporting shaft, means for operating the said screws at each reversal of the work-carriage interchangeably, means for reversing the motion of the grinding wheel frame at the desired limit of its transverse motion, and means operated by the grinding wheel frame for feeding the grinding wheel to the work, substantially as set forth.

28. A grinding machine comprising a base provided with suitable bearings and supports for the various parts, a work-carriage, means for traversing said work-carriage, the grinding wheel frame mounted to slide on a shaft adjacent to said work-carriage, screw gear for traversing said grinding wheel frame across the work, a rack-bar for operating said screw gear through a pinion thereon, said rack being mounted on a crank on the outer end of a shaft connected with the carriage operating gear, said crank comprising a block mounted to be adjusted toward or from the axis of said shaft, and means for effecting said adjustment, substantially as set forth.

29. A grinding machine comprising a base provided with suitable bearings and supports for the various parts, a work-carriage mounted thereon, gearing for traversing said work-carriage back and forth, a grinding wheel frame mounted to slide on a shaft across the work, means for traversing said frame, a connection from the gearing operating the work-carriage to the gearing for traversing the grinding wheel frame comprising a crank wheel on the outer end of a shaft geared to the carriage operating mechanism, a rack-bar extending from the crank-pin of said crank wheel to a pinion for operating the said grinding wheel frame traversing mechanism, said crank wheel comprising a frame connected to its shaft by a slipping connection, means for holding said frame to the shaft under tension, means for limiting the rotation of said frame either at a half or a complete revolution thereof, and means for releasing the grip between said parts at the point of reversal, substantially as set forth.

30. A grinding machine comprising a base provided with suitable bearings and supports for the various parts, a work-carriage mounted to traverse back and forth thereon, gearing for traversing said work-carriage, a grinding wheel frame mounted to slide on a transverse shaft adjacent to said work-carriage, means for traversing said grinding wheel frame across the work operated through a rack-bar and pinion, said rack-bar being connected to a crank on a crank wheel on a shaft geared to the carriage operating mechanism, said crank wheel comprising a base secured rigidly to said shaft, a block or frame surrounding said base and held thereto by a spring brake or shoe, a crank-pin carried by said frame and connected with said rack-bar, a pivoted cam for releasing the brake, and a stop arranged on the frame in position to contact ports for the various parts, a work-carriage mounted thereon, gearing for traversing said carriage back and forth, a grinding wheel frame mounted to pivot and slide on a transverse shaft adjacent to said work-carriage and means for traversing said grinding wheel frame across said work-carriage comprising two oppositely geared screws engaging with nuts carried by said frame, means for locking one or the other of said nuts from rotation, and means for turning said screws at each reversal of the carriage connected with the carriage operating mechanism, substantially as set forth.

18. A grinding machine comprising a base provided with suitable bearings and supports for the various parts, a work-carriage mounted to traverse back and forth on said base, gearing for operating said work-carriage, a grinding wheel frame mounted to pivot and slide on a shaft adjacent to said work-carriage, two screws each engaging with a nut carried loosely by said frame, means for locking one or the other of said nuts from rotation, gears connecting said screws, a pinion loosely mounted on the outer end of one of said screws and carrying a pawl engaging with a ratchet-wheel secured on said screw, a rack-bar engaging with said pinion, a crank mounted on a shaft geared to the carriage operating mechanism, said crank and rack-bar being connected, substantially as set forth.

19. A grinding machine comprising a base provided with suitable bearings and supports for the various parts, a work-carriage mounted thereon, gearing for traversing said work-carriage back and forth, a grinding wheel frame mounted to slide on a shaft adjacent to said work-carriage, transverse screws engaging with nuts loosely mounted in said frame for traversing said frame across the work, a pivoted pawl for engaging one or the other of said nuts and locking it from rotation, means connected with the carriage operating gear for turning said screws at the reversal of the motion of the carriage, and means for automatically throwing the locking pawl out of engagement with one nut and into engagement with the other at pre-determined points in the transverse movements of said frame, substantially as set forth.

20. A grinding machine comprising a base provided with suitable bearings and supports for the various parts, a work-carriage, a grinding wheel frame mounted to slide on a transverse shaft adjacent to said work-carriage, a screw for traversing said frame across the work in one direction, another screw for traversing it in the reverse direction, nuts loosely mounted in said frame with which the said screws engage, a pawl for interchangeably locking one or the other of said nuts, means for turning said screws at each reversal of the work-carriage, and means for throwing the locking pawl out of engagement with one nut and into the engagement with the other at pre-determined points in the transverse movement of the grinding wheel frame, substantially as set forth.

21. A grinding machine comprising a base provided with suitable bearings and supports for the various parts, a work-carriage mounted thereon, gearing for traversing said work-carriage back and forth, a grinding wheel frame mounted to pivot and slide on a transverse shaft adjacent to said work-carriage, means for automatically moving said frame back and forth across the work, and means for feeding the grinding wheel to the work comprising segmental racks on a supporting rocking frame, pinions mounted on a shaft engaging with said segmental racks, said shaft mounted in suitable bearings adjacent to said pivoted frame and provided with a controlling and feeding gear, a pawl-and-ratchet for holding and controlling said gear, and means for operating said pawl-and-ratchet connected with and operated by the means for reversing the movement of the grinding wheel frame, substantially as set forth.

22. A grinding machine comprising a base provided with suitable bearings and supports for the various parts, a work-carriage mounted thereon, gearing for traversing said work-carriage back and forth, a grinding wheel frame mounted to pivot and slide on a shaft transversely of said work-carriage, gearing for traversing said grinding wheel frame back and forth, and means for feeding the grinding wheel to the work comprising segmental racks on a pivoted supporting frame engaging with said grinding wheel frame, pinions mounted on a shaft journaled in supports on the base engaging with said segmental racks, said shaft, gearing for holding and controlling the rotation of said shaft, a pawl-and-ratchet for controlling the feed through said gearing, said pawl being connected to and operated by the means for operating the reversing of the motion of the grinding wheel frame, substantially as set forth.

23. A grinding machine comprising a base provided with suitable bearings and supports for the various parts, a work-carriage mounted thereon, gearing for traversing said work-carriage back and forth, the grinding wheel frame mounted to pivot and slide on a transverse shaft adjacent to said work-carriage, means for traversing said grinding wheel frame across the work, means for reversing the motion of said transverse mechanism, means for controlling the feeding of the grinding wheel to the work comprising gearing connected with and operated by the means for reversing the traverse of the with a projecting arm of said cam at each revolution of said crank wheel, substantially as set forth.

31. A grinding machine comprising a base provided with suitable bearings and supports for the various parts, a work-carriage mounted thereon, gearing for traversing said work-carriage back and forth, a grinding wheel frame mounted to slide on a shaft adjacent to said work-carriage, means for traversing said grinding wheel frame across the work, a rack-bar and pinion connecting the means for traversing the grinding wheel frame with the gearing for traversing the work-carriage, said rack-bar being carried by a crank-pin on a crank-wheel mounted on the outer end of a shaft geared to the carriage operating mechanism, said crank-wheel comprising a base secured to the shaft, an outer wheel held yieldingly to said base, a rigid stop in said frame, a cam lever for releasing the brake holding the outer frame to the rigid base, and a sliding stop mounted in the machine frame diametrically opposite said fixed stop adapted to be slid in and out to contact said lever at each half revolution when desired, substantially as set forth.

32. A grinding machine comprising a base provided with suitable bearings and supports for the various parts, a work-carriage mounted to traverse thereon, said work-carriage being provided with splasher curtains on each side thereof, each of said curtains being mounted on rollers to be adjusted to the height desired, means for holding the work on said carriage, a grinding wheel mounted on a suitable support, and gearing for operating the several parts, substantially as set forth.

33. A grinding machine comprising a base, a work-carriage, the grinding wheel carried by a suitable frame, gearing for operating the several parts, said work-carriage being provided with adjustable side splasher curtains adapted to be raised and lowered as desired, substantially as set forth.

In witness whereof, I have hereunto set my hand and seal at Washington, District of Columbia this 18th day of November; A. D. nineteen hundred and nine.

ABRAHAM B. LANDIS. [L. S.]

Witnesses:
J. D. YOAKLEY,
E. W. BRADFORD.